United States Patent
Rmili et al.

(10) Patent No.: US 10,626,845 B2
(45) Date of Patent: Apr. 21, 2020

(54) WIND TURBINES WITH REDUCED ELECTROMAGNETIC SCATTERING

(71) Applicant: King Abdulaziz University, Jeddah (SA)

(72) Inventors: Hatem Rmili, Jeddah (SA); Abdullah Dobaie, Jeddah (SA); Raj Mittra, Jeddah (SA)

(73) Assignee: King Abdulaziz University, Jeddah (SA)

( * ) Notice: Subject to any disclaimer, the term of this patent is extended or adjusted under 35 U.S.C. 154(b) by 516 days.

(21) Appl. No.: 15/251,264

(22) Filed: Aug. 30, 2016

(65) Prior Publication Data
US 2018/0058423 A1 Mar. 1, 2018

(51) Int. Cl.
*F03D 1/06* (2006.01)
*F03D 80/00* (2016.01)

(52) U.S. Cl.
CPC ............ *F03D 1/0675* (2013.01); *F03D 80/00* (2016.05); *F05B 2260/99* (2013.01);
(Continued)

(58) Field of Classification Search
CPC .............. F05B 2260/99; F05B 2260/00; F05B 2280/107; F05B 2280/1074;
(Continued)

(56) References Cited

U.S. PATENT DOCUMENTS 5,381,149 A * 1/1995 Dougherty ............... G21K 1/10
252/583
9,070,981 B2 6/2015 Park et al.
(Continued)

FOREIGN PATENT DOCUMENTS

| CN | 10-2013-0081947 A | 7/2013 |
|---|---|---|
| EP | 2 504 229 A2 | 10/2012 |
| EP | 2 640 177 A1 | 9/2013 |

OTHER PUBLICATIONS

Design of ultra wideband microwave absorber effectual for objects of arbitrary shape, Yuan-Xun et al., Chinese Physics B vol. 24, No. 12, received Apr. 5, 2015, published Oct. 20, 2015 (Year: 2015).*
Gong Yuan-Xun, et al., "Design of ultra wideband microwave absorber effectual for objects of arbitrary shape", Chinese Physics B, vol. 24, No. 12, Oct. 20, 2015, 7 pages.
Raj Mittra, et al., "A Look at Electromagnetic Field Transformation using Transformation Optics (TO), Wave Equation and Scattering Matrix Formalisms", Forum for Electromagnetic Research Methods and Application Technologies (FERMAT), vol. 5, 2016, 25 pages.
(Continued)

*Primary Examiner* — Kenneth J Hansen
*Assistant Examiner* — Maranatha Boardman
(74) *Attorney, Agent, or Firm* — Oblon, McClelland, Maier & Neustadt, L.L.P.

(57) ABSTRACT

A wind turbine with reduced electromagnetic scattering includes a wind turbine support structure having a cylindrical shape, a wind turbine blade supported by the wind support structure, and a plurality of multi-layer absorbers to limit the electromagnetic scattering, the absorber including at least cobalt ferrite alloy nano-particles, cobalt ferrite alloy nano-flakes, and air. The wind turbine blade includes a blade root, a blade tip opposite the blade root, and a blade middle part extending between the blade root and the blade tip. The plurality of multi-layer absorbers further includes a planar absorber that covers the wind turbine support structure, and a curved absorber that covers the middle part.

11 Claims, 11 Drawing Sheets

(52) U.S. Cl.
CPC . *F05B 2280/107* (2013.01); *F05B 2280/6011* (2013.01); *Y02E 10/721* (2013.01); *Y02E 10/726* (2013.01)

(58) Field of Classification Search
CPC ...... F05B 2280/1071; F05B 2280/6011; F05B 2280/101; F03D 1/0675; F03D 80/00
USPC ..................................................... 416/241 R
See application file for complete search history.

(56) References Cited

U.S. PATENT DOCUMENTS

| | | | | |
|---|---|---|---|---|
| 9,413,075 | B2* | 8/2016 | Avouris | H01Q 17/00 |
| 2013/0135135 | A1* | 5/2013 | Appleton | B32B 33/00 |
| | | | | 342/1 |
| 2013/0177436 | A1* | 7/2013 | Baucke | F03D 1/0675 |
| | | | | 416/232 |
| 2013/0224023 | A1* | 8/2013 | Kim | B32B 37/24 |
| | | | | 416/146 R |
| 2013/0280087 | A1* | 10/2013 | Appleton | B29C 44/06 |
| | | | | 416/241 A |
| 2017/0145988 | A1* | 5/2017 | March Nomen | F03D 80/30 |

OTHER PUBLICATIONS

Raj Mittra, et al., "Design of Absorptive Coatings for Arbitrarily Shaped Targets for Reduction of Radar Cross Section (RCS) Using an Alternative to the Transformation Optics (TO) Algorithm", Progress in Electromagnetics Research (Invited Paper), vol. 147, 2014, pp. 153-170.

Hu Tao, et al., "Highly flexible wide angle of incidence terahertz metamaterial absorber: Design, fabrication, and characterization", Physical Review B (/PRB/), vol. 78, No. 24, Dec. 19, 2008, 3 pages (Abstract only).

Guo-Hui Yang, et al., "Broadband polarization-insensitive absorber based on gradient structure metamaterial", Journal of Applied Physics, vol. 115, No. 17, Apr. 2014, 3 pages (Abstract only).

Y. X. Gong, et al., "Synthesis and microwave electromagnetic properties of CoFe alloy nanoflakes prepared with hydrogen-thermal reduction method", Journal of Applied Physics, vol. 106, 2009, 5 pages.

L. Zhen, et al., "Synthesis of $CoFe/Al_2O_3$ composite nanoparticles as the impedance matching layer of wideband multilayer absorber", Journal of Applied Physics, vol. 109, 2011, 3 pages.

Xingchen Zhao, et al., "Excellent microwave absorption property of Graphene-coated Fe nanocomposites", Scientific Reports, vol. 3, 2013, 5 pages.

* cited by examiner

WIND TURBINES WITH REDUCED ELECTROMAGNETIC SCATTERING

BACKGROUND

Field of the Disclosure

The present disclosure relates to wind turbines and, more specifically, wind turbine blades, wind turbine poles and wind turbine assemblies with a coating to reduce electromagnetic scattering.

Description of the Related Art

Wind power may be one of the cleanest and most environmentally friendly sources of energy presently available, and wind turbines have gained increased attention in this regard.

Wind turbines are typically used to convert kinetic energy from the wind into electrical power. In order to effectively and continuously harvest wind energy, these wind turbines have to be placed in a variety of locations. These locations may include a wide variety of different geological and topographical locations such as shore lines, mountains, or plains.

However, certain locations may prevent or restrict the installation and usage of wind turbines due to strong interferences that can be generated by the wind turbines. For example, the installation and usage of wind turbines near meteorology radars, cellphone relays, Wi-Fi antennas, TV emitters and receivers may be restricted due to the large electromagnetic scattering waves that the wind turbines can generate.

Thus, a wind turbine solving the aforementioned problem of electromagnetic scattering is desired.

SUMMARY

Accordingly, the object of the present disclosure is to provide a wind turbine blade and associated wind turbine which overcomes or at least reduces the above-mentioned limitations.

The wind turbine of the present invention ensures reduction of electromagnetic scattering due to a coating including a plurality of electromagnetic absorbers with different configurations and/or compositions that cover different surfaces of the wind turbine such as the support structure surface, the leading surface, the trailing surface, the pressure surface, or the suction surface. The configuration and/or composition of each absorber is selected depending on geometrical characteristics of surfaces such as the curvatures of the critical surfaces.

In one non-limiting illustrative example, a wind turbine blade having reduced electromagnetic scattering is presented. The wind turbine blade may be used in a wind turbine assembly that includes a wind turbine support structure having a cylindrical shape; at least one wind turbine blade supported by the wind support structure, each wind turbine blade including: a blade root, a blade tip opposite the blade root, and a blade middle part extending between the blade root and the blade tip, the blade middle part having: a leading surface that extends between the blade root and the blade tip, a trailing surface opposite the leading surface and that extends between the blade root and the blade tip, a suction surface that extends between the trailing surface and the leading surface, and a pressure surface that extends between the trailing surface and the leading surface; and a plurality of multi layer absorbers to limit the electromagnetic scattering that contain cobalt ferrite alloy nano-particles, cobalt ferrite alloy nano-flakes, and/or air, each multi-layer absorber including: a planar absorber that covers the wind turbine support structure, a moderately curved absorber that covers the suction surface and the pressure surface, and a curved absorber that covers the trailing surface and the leading surface.

In another non-limiting illustrative example, a wind turbine to limit electromagnetic scattering is presented. The wind turbine includes a wind turbine support structure having a cylindrical shape; a wind turbine blade supported by the wind support structure, the wind turbine blade including: a blade root, a blade tip opposite the blade root, and a blade middle part extending between the blade root and the blade tip; and a plurality of multi-layer absorbers to limit the electromagnetic scattering that contains cobalt ferrite alloy nano-particles, cobalt ferrite alloy nano-flakes, and/or air, each multi-layer absorber including: a planar absorber that covers the wind turbine support structure, and a curved absorber that covers the blade middle part.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
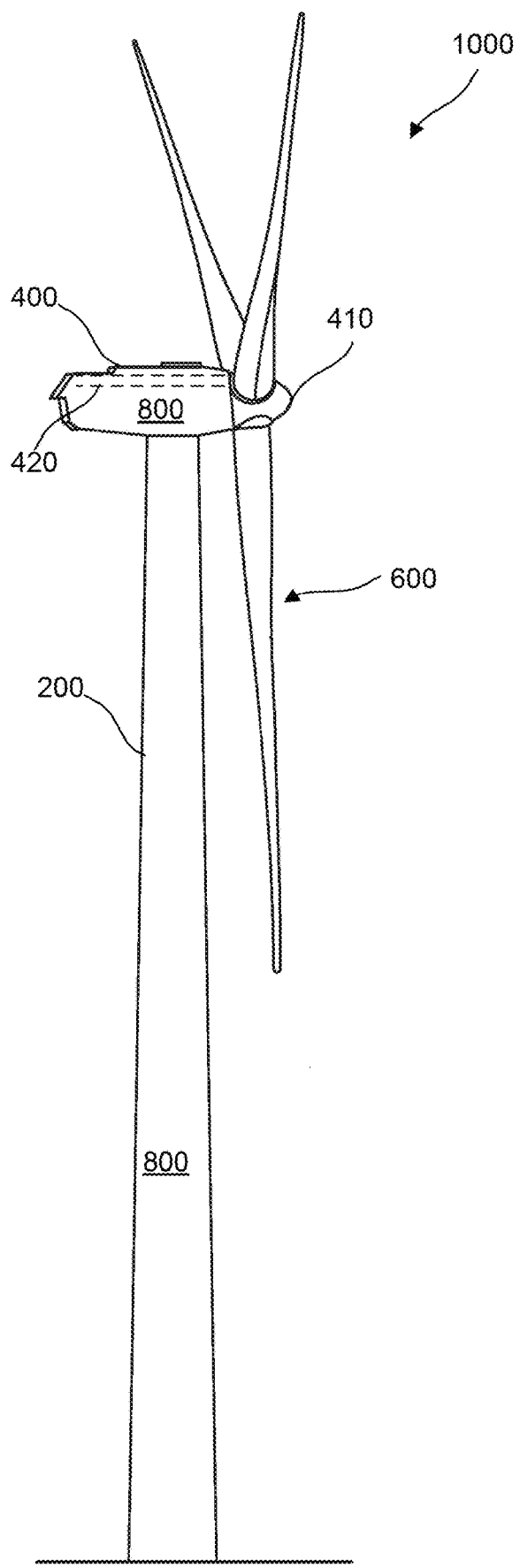
FIG. 1 is a perspective view of a wind turbine, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Wind turbines, wind turbine structural supports, and wind turbine blades with a special coating of limited thickness to provide wide band electromagnetic scattering absorption while limiting extra drag are disclosed. Particularly, a coating including a plurality of electromagnetic absorbers with different configurations and/or compositions and placed on different critical surfaces of the wind turbine is presented. The configuration and/or composition of each absorber of the plurality of absorbers is selected depending on geometrical characteristics of the critical surfaces, such as the curvature. For example, a wind turbine structure having a large cylindrical shape can be coated with a planar absorber suitable for a surface with a weak curvature, while a wind turbine blade having a sharp shape can be coated with a curved absorber suitable for a surface with a strong curvature.

FIG. 1 is a perspective view of a wind turbine 1000, according to certain aspects of the disclosure.

The wind turbine 1000 may include a wind turbine support structure 200, a nacelle 400 mounted on the wind turbine support structure 200, a rotor hub 410 mounted on the nacelle 400, and a plurality of wind turbine blades 600 mounted on the rotor hub 410.

The rotor hub 410 can be connected to a main flange that turns a main rotor shaft 420, while the nacelle 400 can house wind turbine power generation and control components.

The wind turbine 1000 may include a coating 800 configured to provide a wide band electromagnetic scattering absorption, e.g., between 0.5 GHz and 25 GHz, and particularly between 2 GHz and 18 GHz, between 4 GHz and 12 GHz, or between 6 GHz and 10 GHz. In addition, the coating 800 can be configured to have a thin thickness, e.g., from 1 mm to 1 cm, and preferably from 2 mm to 50 mm, from 3 mm to 25 mm, or from 5 mm to 10 mm.

The wind turbine 1000 illustrated in FIG. 1 is provided for illustration purposes only and not intended to limit the application of this disclosure to a specific wind turbine type.

Figure 2:
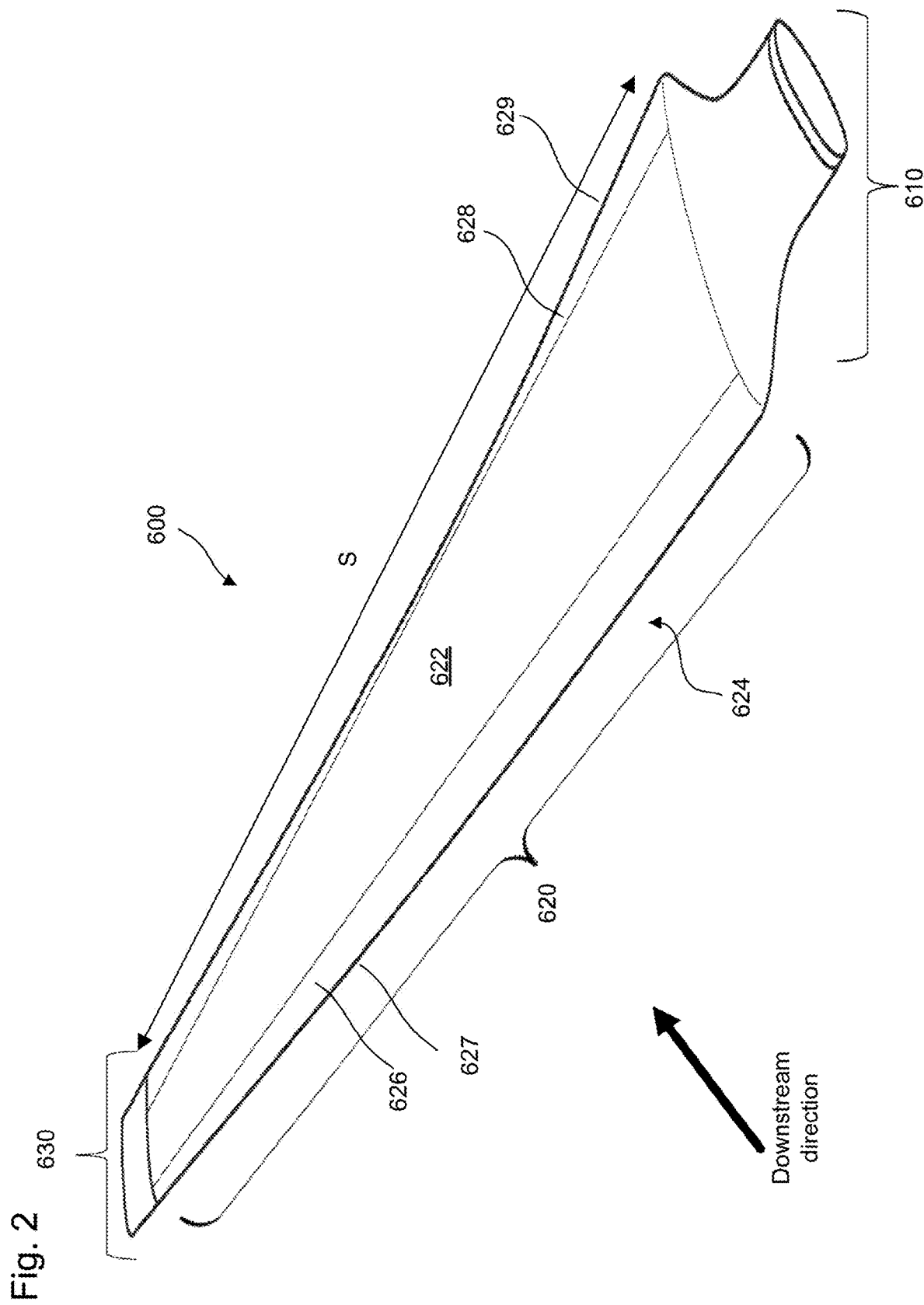
FIG. 2 is a perspective view of a wind turbine blade, according to certain aspects of the disclosure.

FIG. 2 is a perspective view of a wind turbine blade of the plurality of wind turbine blades 600, according to certain aspects of the disclosure.

Each wind turbine blade of the plurality of wind turbine blades 600 may include a blade root 610 to mount the wind turbine blade 600 onto a mounting flange (not illustrated) of the rotor hub 410, a blade tip 630 opposite the blade root 610, and a blade middle part 620 that extends between the blade root 610 and the blade tip 630.

The blade middle part 620 can include a leading surface 626 that extends between the blade root 610 and the blade tip 630 in a longitudinal direction, a trailing surface 628 opposite the leading surface 626 and that extends between the blade root 610 and the blade tip 630 in the longitudinal direction, a pressure surface 622 and a suction surface 624 that both extend between the trailing surface 628 and the leading surface 626 in a downstream direction, see arrow in FIG. 2.

Figure 3A:
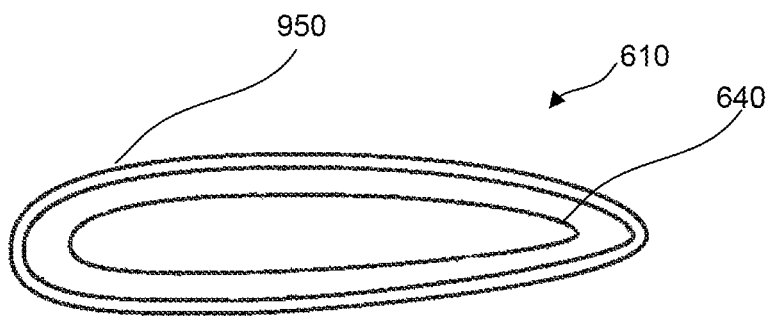
FIG. 3A is a sectional view of a blade root of the wind turbine blade, according to certain aspects of the disclosure.
Figure 3B:
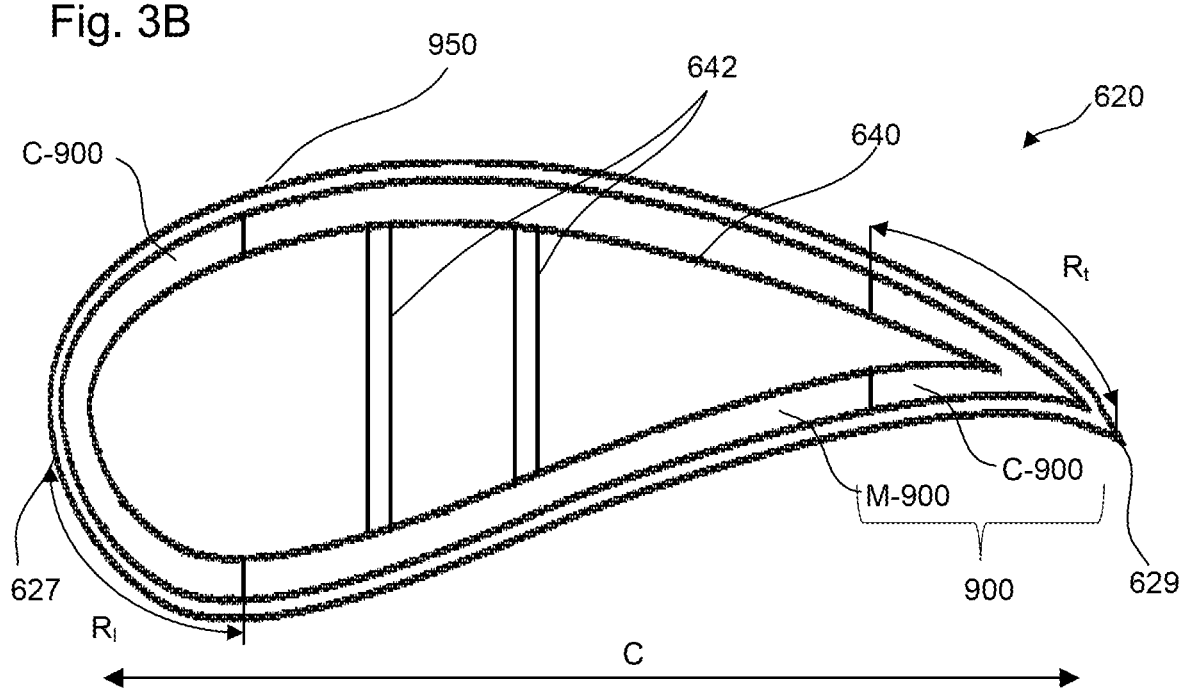
FIG. 3B is a sectional view of a blade middle part of the wind turbine blade, according to certain aspects of the disclosure.

The leading surface 626 may extend from a leading edge 627 along a predetermined leading radius $R_l$ in the downstream direction, see FIG. 3B.

The predetermined leading radius $R_l$ may correspond to a curvature reduction of the blade middle part 620. For example, the predetermined leading radius $R_l$ may be determined via the curvature of the blade middle part 620 along the downstream direction. For example, the predetermined leading radius $R_l$ may be such that at the predetermined leading radius $R_l$ from the leading edge 627, the curvature of the blade middle part 620 reaches a predetermined leading curvature threshold $C_l$. The predetermined leading curvature threshold $C_l$ may depend on a local leading curvature $C_{l0}$ around the leading edge 627, e.g., the predetermined leading curvature threshold $C_l$ may correspond to a percentage of the local leading curvature $C_{l0}$.

Similarly, the trailing surface 628 may extend from a trailing edge 629 along a predetermined trailing radius $R_t$ on an upstream direction, see FIG. 3B.

The predetermined trailing radius $R_t$ may correspond to a curvature reduction of the blade middle part 620. For example, the predetermined trailing radius $R_t$ may be determined via the curvature of the blade middle part 620 along the upstream direction. For example, the predetermined trailing radius $R_t$ may be such that at the predetermined trailing radius $R_t$ from the trailing edge 629 the curvature of the blade middle part 620 reaches a predetermined trailing curvature threshold $C_t$. The predetermined trailing curvature threshold $C_t$ may depend on a local trailing curvature $C_{t0}$ around the trailing edge 629, e.g., the predetermined trailing curvature threshold $C_t$ may correspond to a percentage of the local trailing curvature $C_{t0}$.

In addition, the blade middle part 620 can be defined by a span length S between the blade root 610 and the blade tip 630 and a chord length C between the leading edge 627 and the trailing edge 629. The chord length C may vary with respect to the span length S as the wind turbine blade 600 extends from the blade root 610 to the blade tip 630.

The span length S may be between 0.1 m and 200 m, and particularly between 20 m and 90 m, preferably between 30 m and 50 m, or between 35 m and 45 m. The chord length C may be between 5 mm and 10 m, and particularly between 0.1 m and 7 m, preferably between 0.5 m and 5 m, or between 1 m and 3 m.

In one of the preferred embodiments, the curvature at a local area of the blade middle part 620, e.g., the area around the leading edge 627 or the area around the trailing edge 629, may be defined as the ratio between the chord length C and a radius of an osculating sphere at the local area, wherein the osculating sphere is a unique sphere which most closely approximates the local area.

For example, the local leading curvature $C_{lo}$ around the leading edge 627 may be between 1 and 500, and particularly between 10 and 100, preferably between 15 and 50, or between 20 and 30, while the local trailing curvature $C_{lo}$ around the trailing edge 629 may be between 10 and 1000, and particularly between 50 and 800, preferably between 200 and 600, or between 300 and 500.

Figure 3C:
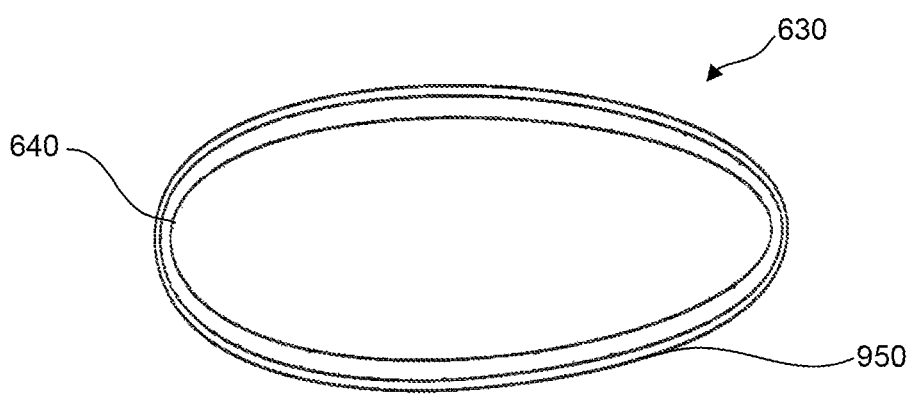
FIG. 3C is a sectional view of a blade tip of the wind turbine blade, according to certain aspects of the disclosure.

FIGS. 3A-3C are sectional views of the blade root 610, the blade middle part 620, and the blade tip 630 according to certain aspects of the disclosure.

The wind turbine blade 600 may also include a shell 640 and a plurality of support members 642 to provide structure and rigidity to the wind turbine blade 600.

The shell 640 can be composed of any material enabling the capture of incoming wind and rotation of the wind turbine blade 600 and to be supported by the plurality of support members 642.

For example, the shell 640 can be made from metallic alloys, e.g., such as aluminum or aluminum-magnesium alloys, or composite materials such as fiberglass materials, carbon fiber materials, and multilayered materials, e.g., a plurality of fiberglass layers that are connected to one another through adhesives, e.g., glues, tapes, or the like, mechanical fasteners, e.g., screws, bolts, or the like, or any combination thereof.

Similarly, the plurality of support members 642 can be made from metallic alloys, e.g., such as aluminum or aluminum-magnesium alloys, or composite materials, e.g., fiberglass materials, carbon fiber materials, or multilayered materials that are connected to one another through adhesives, e.g., glues, tapes, or the like, mechanical fasteners, e.g., screws, bolts, or the like, or any combination thereof.

While specific embodiments of the wind turbine blade 600 have been disclosed herein, it should be noted that these embodiments are not intended to be limiting and alternative wind turbine blades, e.g., using additional and/or alternative materials, designs or the like, should also be taken into account.

The coating 800 may be configured to provide an electromagnetic scattering absorption such that a reduction of the reflection co-efficient is achieved for a wide band of frequencies, while also having a relatively thin thickness. For example, the reduction of the reflection co-efficient may be at least −10 dB, preferably from −10 dB to −50 dB, preferably from −15 dB to −40 dB, preferably from −17 dB to −37 dB, the wide band of frequencies may refer to a range between 0.5 GHz and 25 GHz, and particularly, between 2 GHz and 18 GHz, preferably between 4 GHz and 12 GHz, or between 6 GHz and 10 GHz and relatively thin thickness may refer to a thickness between 1 mm and 1 cm, and particularly, between 3 mm and 30 mm, preferably between 5 mm and 23 mm, or between 10 mm and 24 mm.

Figure 4:
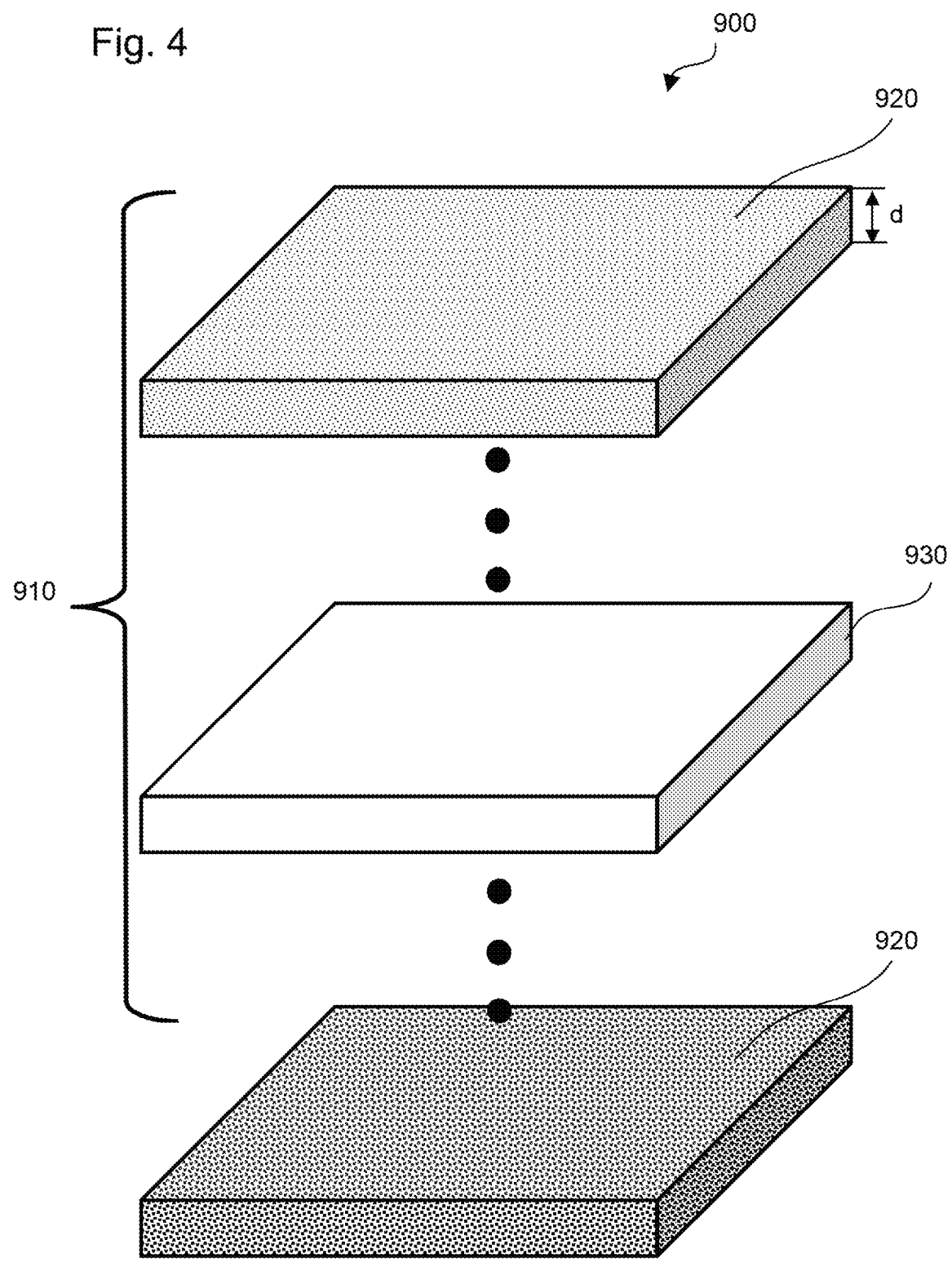
FIG. 4 is an exploded schematic view of an absorber of a plurality of absorbers, according to certain aspects of the disclosure.

FIG. 4 is an exploded schematic view of an absorber of a plurality of absorbers 900, according to certain aspects of the disclosure.

The coating 800, see FIG. 1, may include a plurality of absorbers 900, wherein each absorber of the plurality of absorbers 900 may have different configurations and/or compositions and be placed on different critical surfaces of the wind turbine 1000, such as the surface of the wind turbine support structure 200, the leading surface 626, the trailing surface 628, the pressure surface 622, or the suction surface 624.

The configuration and/or composition of each absorber 900 is configured depending on geometrical characteristics of the critical surfaces, and particularly, on the curvature of the critical surfaces.

Each absorber 900 may have a multi-layer structure that includes a plurality of stacked layers 910 configured to act as a lossy medium, i.e., a medium with a non-negligible conductivity to yield a large amount of dielectric loss that inhibits the propagation of electromagnetic waves, wherein a non-negligible conductivity may correspond to a conductivity value greater than $10^{-6}$ S·m$^{-1}$ and a large amount of loss may correspond to a tangent loss value greater than $10^{-3}$.

Each layer of the plurality of stacked layers 910 may include filler materials 920 dispersed throughout in a foam matrix 930 and be characterized by a thickness "d" to provide a wide electromagnetic scattering absorption. For example, the thickness "d" may vary from 1 µm to 20 mm, and preferably from 0.1 mm to 5 mm, from 0.5 mm to 2 mm or about 1 mm.

The foam matrix 930 may be made of open cell polyurethane foam that can support the filler materials 920 and allow for the dispersed incorporation of the filler materials 920 while not thickening a surface of the wind turbine blade 600 such that, the wind turbine 1000 would require redesign to maintain efficiency.

The filler materials 920 may be dielectric, ferrite and/or ferromagnetic alloy materials, such as carbon nano-tubes, ceramic fiber, barium ferrite, carbonyl fiber. Particularly, the filler materials 920 may be cobalt ferrite alloy nano-particles (NP) and/or nano-flakes (NF).

Figure 5A:
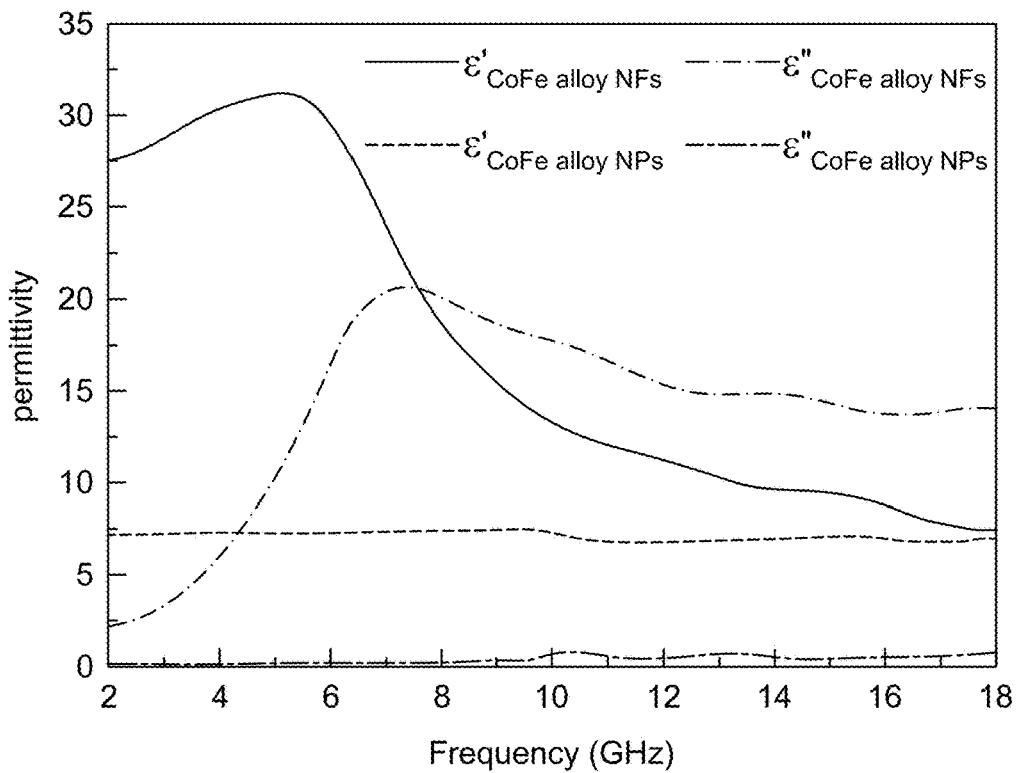
FIG. 5A represents permittivity and permeability versus frequency for cobalt ferrite alloy nano-particles, according to certain aspects of the disclosure.
Figure 5B:
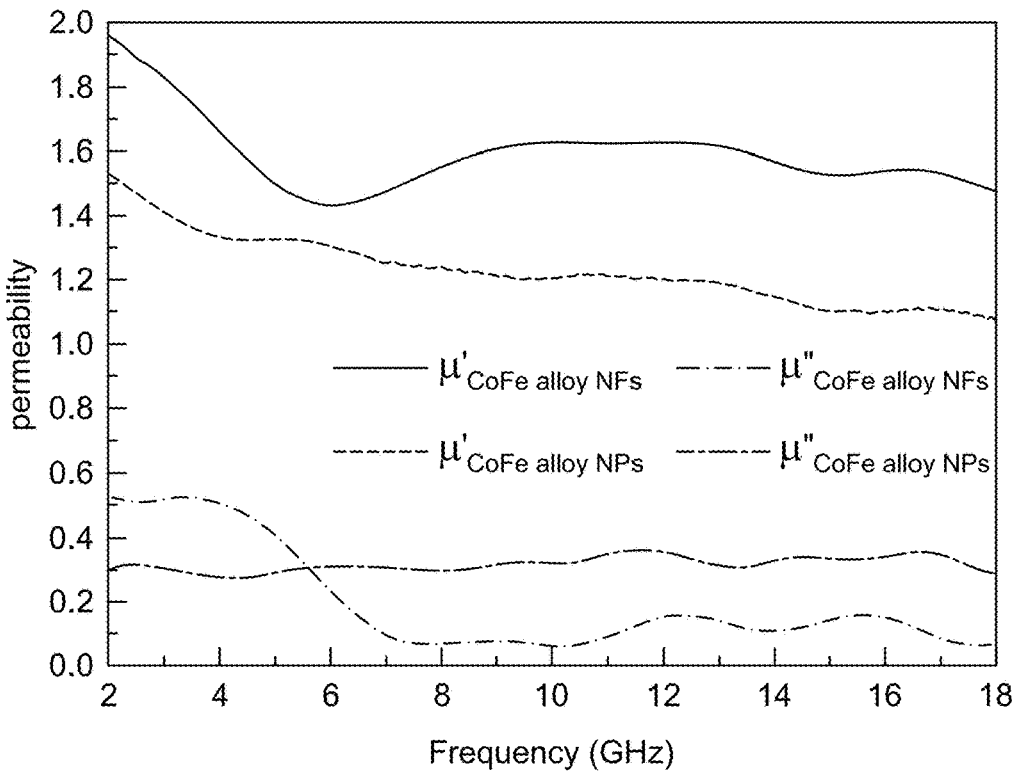
FIG. 5B represents permittivity and permeability versus frequency for cobalt ferrite alloy nano-flakes, according to certain aspects of the disclosure.
Figure 6A:
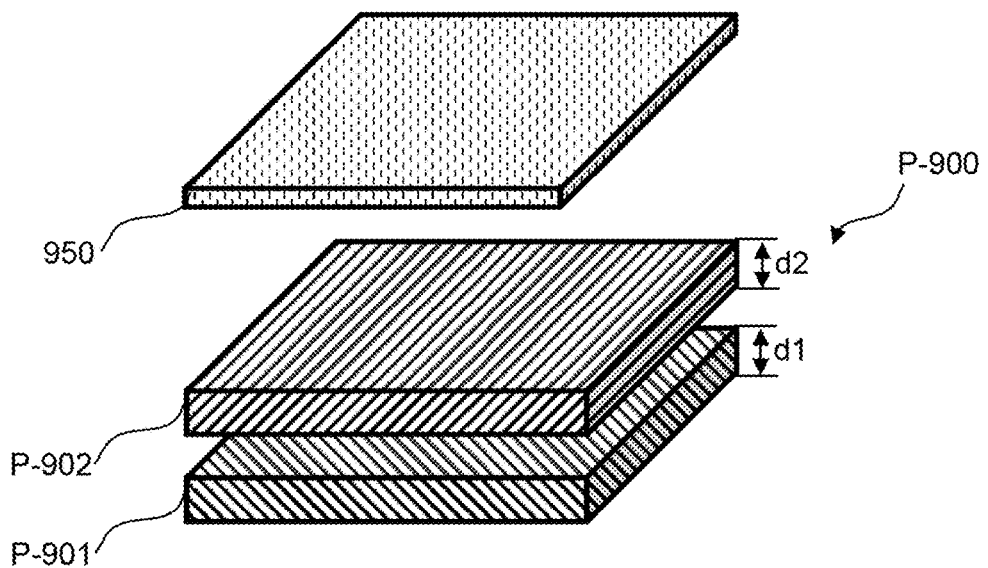
FIG. 6A is an exploded schematic view of a planar absorber, according to certain aspects of the disclosure.
Figure 6B:
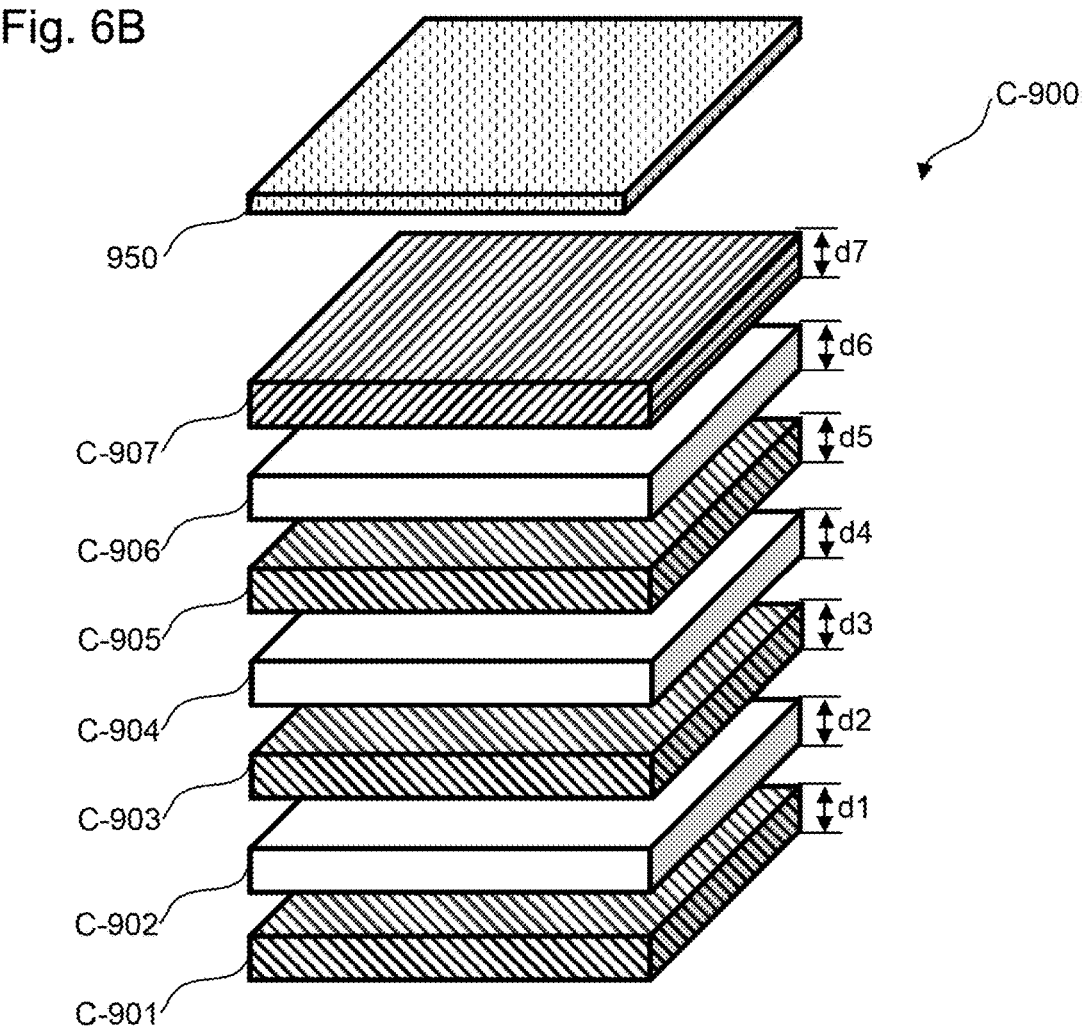
FIG. 6B is an exploded schematic view of a curved absorber, according to certain aspects of the disclosure.
Figure 6C:
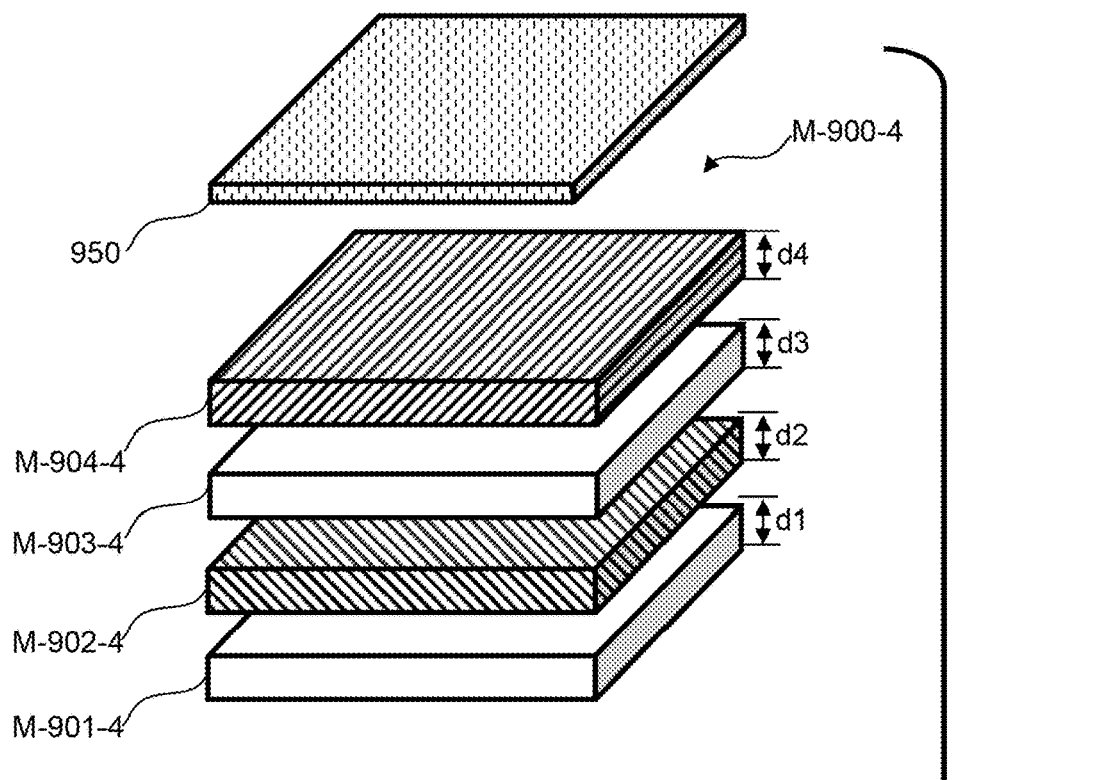
FIG. 6C is an exploded schematic view of a moderately curved absorber in a four-layer configuration, according to certain aspects of the disclosure.
Figure 6D:
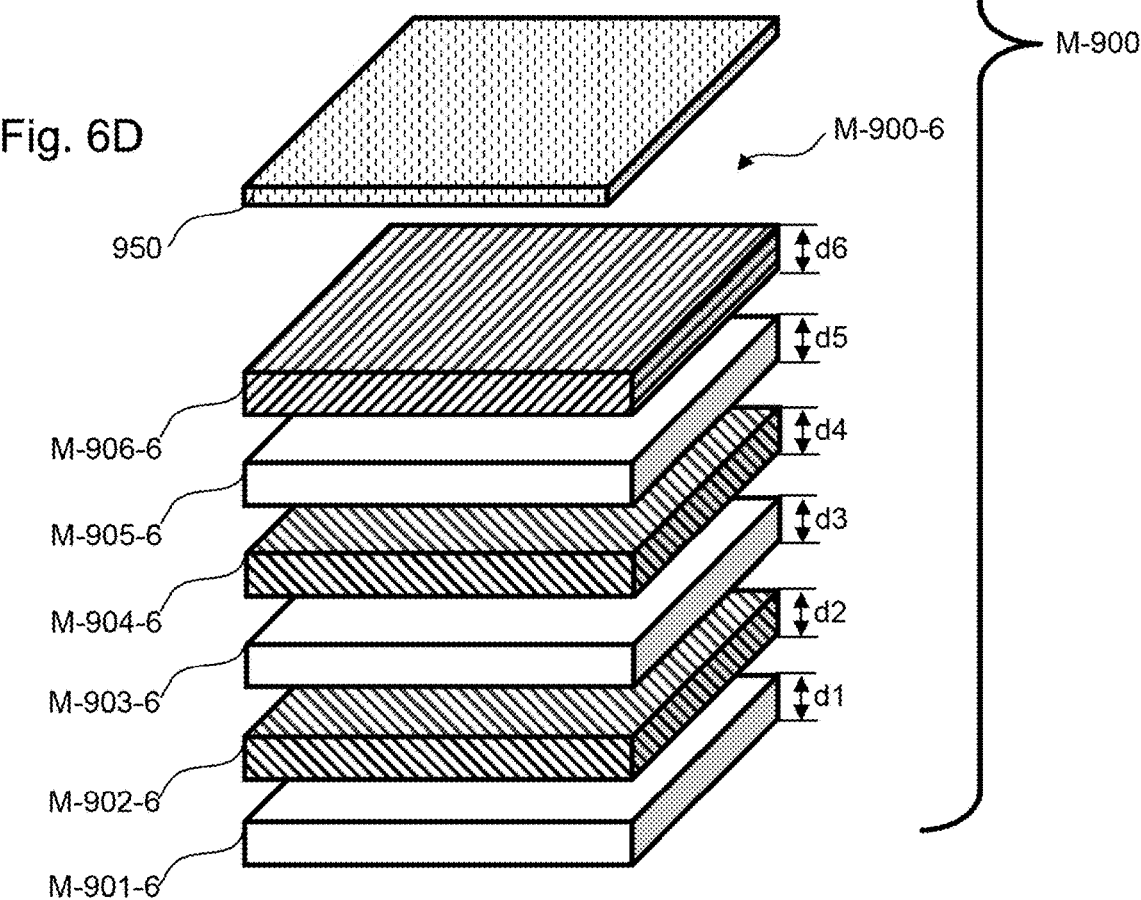
FIG. 6D is an exploded schematic view of the moderately curved absorber in a six-layer configuration, according to certain aspects of the disclosure.

FIGS. 5A-5B represent permittivity and permeability versus frequency for the cobalt ferrite alloy NP and the cobalt ferrite alloy NF, respectively and according to certain aspect of the disclosure.

The cobalt ferrite alloy NP may be characterized by a NP permittivity $\varepsilon_{NP}$ having a real part $\varepsilon'_{CoFe\ alloy\ NPs}$ and an imaginary part $\varepsilon''_{CoFe\ alloy\ NPs}$ and a NP permeability $\mu_{NP}$ having a real part $\mu'_{CoFe\ alloy\ NPs}$ and an imaginary part $\mu''_{CoFe\ alloy\ NPs}$. Similarly, the cobalt ferrite alloy NF may be characterized by a NF permittivity $\varepsilon_{NF}$ having a real part $\varepsilon'_{CoFe\ alloy\ NFs}$ and an imaginary part $\varepsilon''_{CoFe\ alloy\ NFs}$ and a NF permeability $\mu_{NF}$ having a real part $\mu'_{CoFe\ alloy\ NFs}$ and an imaginary part $\mu_{CoFe\ alloy\ NFs}$.

The cobalt ferrite alloys NP and NF may be selected as the filler materials 920 to provide strong permittivity and permeability values over a wide band of frequencies. For example, the real part of the NP permittivity $\varepsilon'_{CoFe\ alloy\ NPs}$ may provide permittivity values greater than 5 for frequencies from 2 GHz to 18 GHz, the real part of the NF permittivity $\varepsilon'_{CoFe\ alloy\ NFs}$ may provide permittivity values greater than 15 for frequencies from 2 GHz to 10 GHz and greater than 5 for frequencies from 10 GHz to 18 GHz, the real part of the NP permeability $\mu'_{CoFe\ alloy\ NPs}$ may provide permeability values greater than 1.0 for frequencies from 2 GHz to 18 GHz, and the real part of the NF permeability $\mu'_{CoFe\ alloy\ NFs}$ may provide permeability values greater than 1.4 for frequencies from 2 GHz to 18 GHz.

In the present disclosure, the values of the NP permittivity $\varepsilon_{NP}$ and the NF permittivity $\varepsilon_{NF}$ are nondimensionalized by the vacuum permittivity $\varepsilon_0$, while the values of the NP permeability $\mu_{NP}$ and the NF permeability $\mu_{NP}$ are nondimensionalized by the vacuum permeability $\mu_0$.

FIGS. 6A-6D are exploded schematic views of a planar absorber P-900, a curved absorber C-900, a moderately curved absorber M-900 in a four-layer configuration, and the moderately curved absorber M-900 in a six-layer configuration, respectively, and according to certain aspects of the disclosure.

The plurality of absorbers 900 may include the planar absorber P-900 that covers the wind turbine support structure 200 and the curved absorber C-900 that covers the wind turbine blade 600 to provide a wideband electromagnetic scattering absorption while minimizing the thickness of the coating 800.

The planar absorber P-900 is suitable for a surface having weak curvatures, e.g., curvature less than 1, such as a large cylindrical surface of the wind turbine support structure 200, while the curved absorber C-900 is suitable for a surface having strong curvatures, such as the wind turbine blade 600 and particularly, the leading surface 626 and the trailing surface 628.

In one of the preferred embodiments, the planar absorber P-900 may include a first layer P-901 filled with CoFe NF having a first layer thickness d1 between 1.70 mm and 1.80 mm, and a second layer P-902 stacked on top of the first layer P-901 and filled with CoFe NP having a second layer thickness d2 between 1.20 mm and 1.30 mm.

In one of the preferred embodiments, the curved absorber C-900 may include a first layer C-901, a second C-902 layer stacked on top of the first layer C-901, a third layer C-903 stacked on top of the second layer C-902, a fourth layer C-904 stacked on top of the third layer C-903, a fifth layer C-905 stacked on top of the fourth layer C-904, a sixth layer C-906 stacked on top of the fifth layer C-905, and a seventh layer C-907 stacked on top of the sixth layer C-906. The first layer C-901 may be filled with CoFe NF and have a first layer thickness d1 between 11.45 mm and 11.55 mm, the second layer C-902 may be filled with air and have a second layer thickness d2 between 3.35 mm and 3.40 mm, the third layer C-903 may be filled with CoFe NF and have a third layer thickness d3 between 1.05 mm and 1.10 mm, the fourth layer C-904 may be filled with air and have a fourth layer thickness d4 between 4.45 mm and 4.55 mm, the fifth layer C-905 may be filled with CoFe NF and have a fifth layer thickness d5 between 2.10 mm and 2.20 mm, the sixth layer C-906 may be filled with air and have a sixth layer thickness d6 between 1.76 mm and 1.86 mm, and the seventh layer C-907 may be filled with CoFe NP and have a seventh layer thickness d7 between 0.60 mm and 0.65 mm.

In addition, the plurality of absorbers 900 may include a moderately curved absorber M-900 that covers areas of the wind turbine 1000 with a moderate curvature, e.g., a curvature greater than the wind turbine support structure 200 but less than the curvature of the leading edge 627 and/or the trailing edge 629, such as the suction surface 624 and/or the pressure surface 622.

The moderately curved absorber M-900 may include one of a four-layer absorber M-900-4 and a six-layer absorber M-900-6.

In one of the preferred embodiments, the four-layer absorber M-900-4 may include a first layer M-901-4, a second layer M-902-4 stacked on top of the first layer M-901-4, a third layer M-903-4 stacked on top of the second layer M-902-4, and a fourth layer M-904-4 stacked on top of the third layer M-903-4. The first layer M-901-4 may be filled with air and have a first layer thickness d1 between 2.10 mm and 2.20 mm, the second layer M-902-4 may be filled with CoFe NF and have a second layer thickness d2 between 0.84 mm and 0.94 mm, the third layer M-903-4 may be filled with air and have a third layer thickness d3 between 1.28 mm and 1.38 mm, and the fourth layer M-904-4 may be filled with CoFe NP and have a fourth layer d4 thickness between 0.60 mm and 0.70 mm.

In one of the preferred embodiments, the six-layer absorber M-900-6 may include a first layer M-901-6, a second M-902-6 layer stacked on top of the first layer M-901-6, a third layer M-903-6 stacked on top of the second layer M-902-6, a fourth layer M-904-6 stacked on top of the third layer M-903-6, a fifth layer M-905-6 stacked on top of the fourth layer M-904-6, and a sixth layer M-906-6 stacked on top of the fifth layer M-905-6. The first layer M-901-6 may be filled with air and have a first layer thickness d1 between 0.01 mm and 0.11 mm, the second layer M-902-6 may be filled with CoFe NF and have a second layer thickness d2 between 2.74 mm and 2.84 mm, the third layer M-903-6 may be filled with air and have a third layer thickness d3 between 4.37 mm and 4.47 mm, the fourth layer M-904-6 may be filled with CoFe NF and have a fourth layer thickness d4 between 0.28 mm and 0.38 mm, the fifth layer M-905-6 may be filled with air and have a fifth layer thickness d5 between 2.10 mm and 2.20 mm, and the sixth layer M-906-6 may be filled with CoFe NP and have a sixth layer thickness d6 between 0.55 mm and 0.65 mm.

Alternatively, a resistance sheet 950 may be inserted on top of at least one of the planar absorber P-900, the moderately curved absorber M-900, and the curved absorber C-900. The resistance sheet 950 may be made of electrically resistive materials, such as graphene, to provide an electrical resistance between 300 Ohms and 400 Ohms.

Alternatively, in addition or in substitution to the CoFe NP and/or the CoFe NF as the filler materials 920, graphene-coated ferrite nano-composite may be used.

Figure 7:
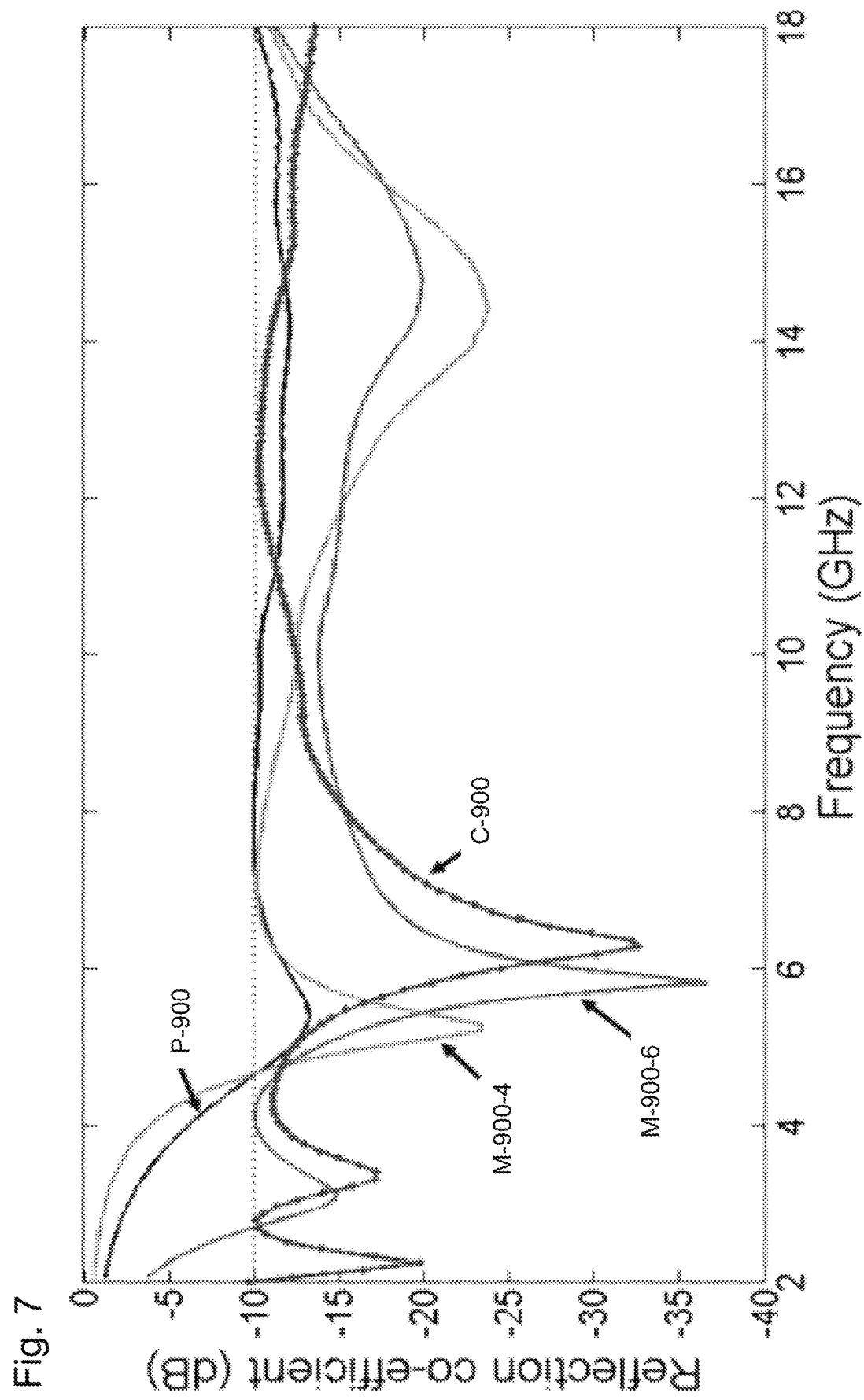
FIG. 7 represents reflection coefficient versus frequency for a planar absorber, a four-layer absorber, a six-layer absorber, and a curved absorber, according to certain aspects of the disclosure.

FIG. 7 represents reflection coefficient versus frequency for the planar absorber P-900, the four-layer absorber M-900-4, the six-layer absorber M-900-6, and the curved absorber C-900, according to certain aspects of the disclosure.

The planar absorber P-900, the four-layer absorber M-900-4, the six-layer absorber M-900-6, and the curved absorber C-900 may be configured to provide strong reflection coefficient values over a wide band of frequencies. For example, the planar absorber P-900, the four-layer absorber M-900-4, the six-layer absorber M-900-6, and the curved absorber C-900 may provide reflection coefficient values lower than −10 dB for frequencies from 4.6 GHz to 18 GHz. Particularly, the curved absorber C-900 may provide reflection coefficient values lower than −10 dB for frequencies from 2 GHz to 18 GHz, and reflection coefficient values lower than −25 dB for frequencies from 6 GHz to 7 GHz.

Figure 8A:
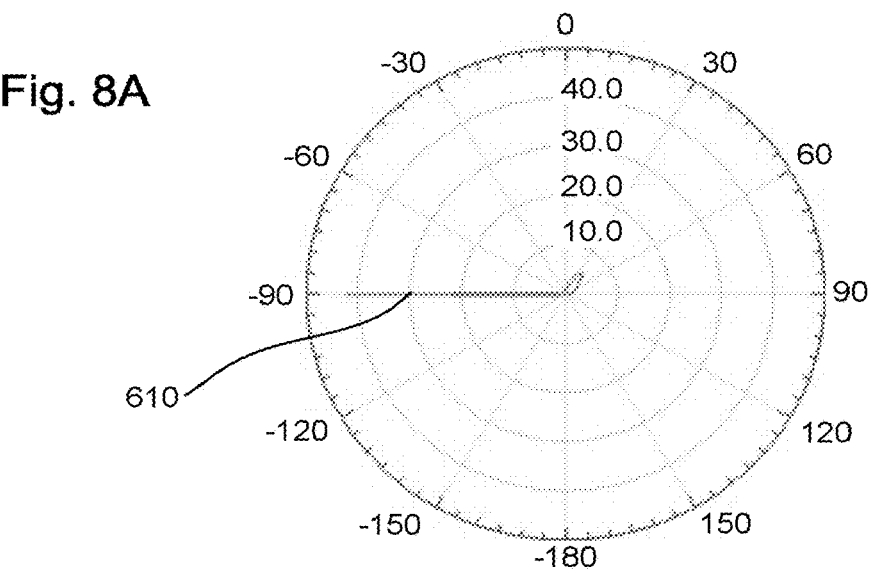
FIG. 8A represents scattering patterns for the blade root without a coating, according to certain aspects of the disclosure.
Figure 8B:
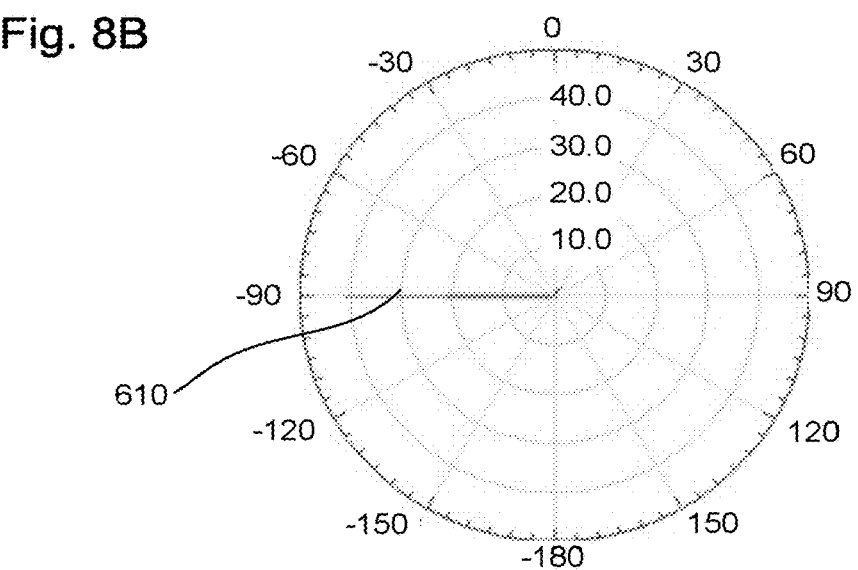
FIG. 8B represents scattering patterns for the blade root coated with the planar absorber, according to certain aspects of the disclosure.
Figure 8C:
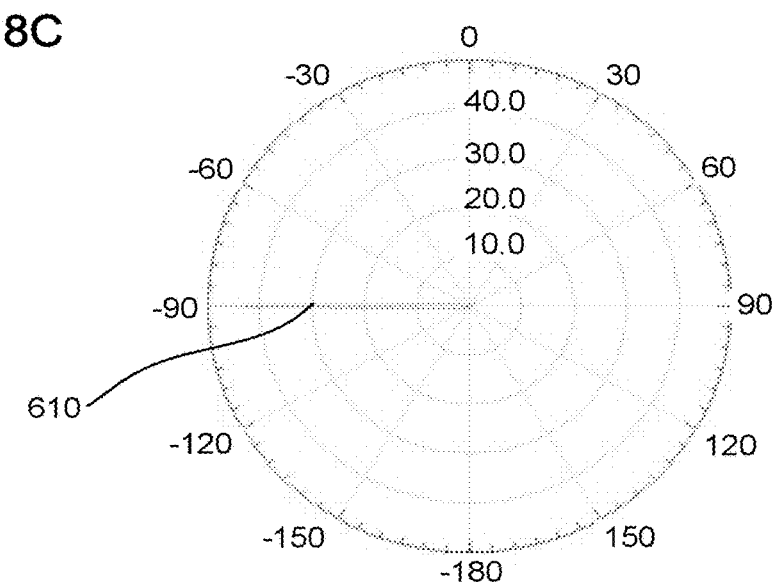
FIG. 8C represents scattering patterns for the blade root coated with the curved absorber, according to certain aspects of the disclosure.
Figure 9A:
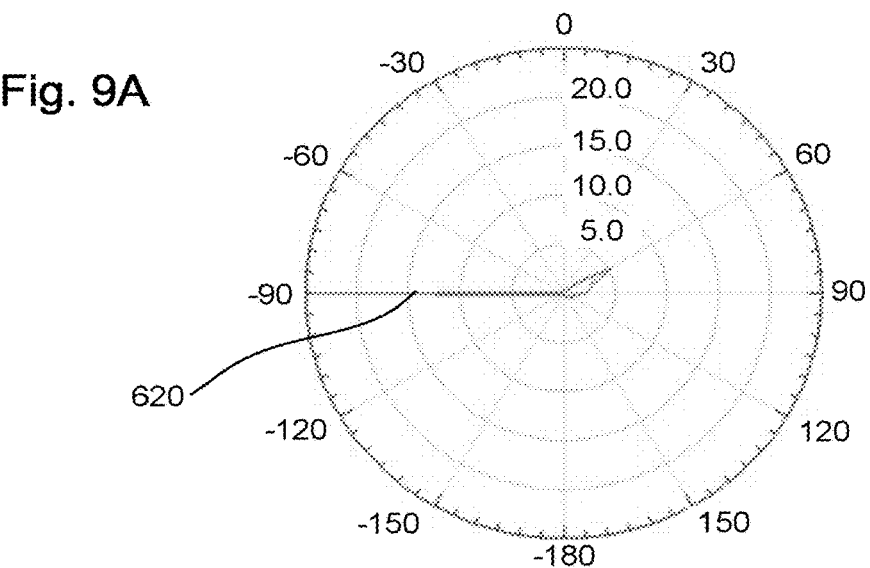
FIG. 9A represents scattering patterns for the blade middle part without a coating, according to certain aspects of the disclosure.
Figure 9B:
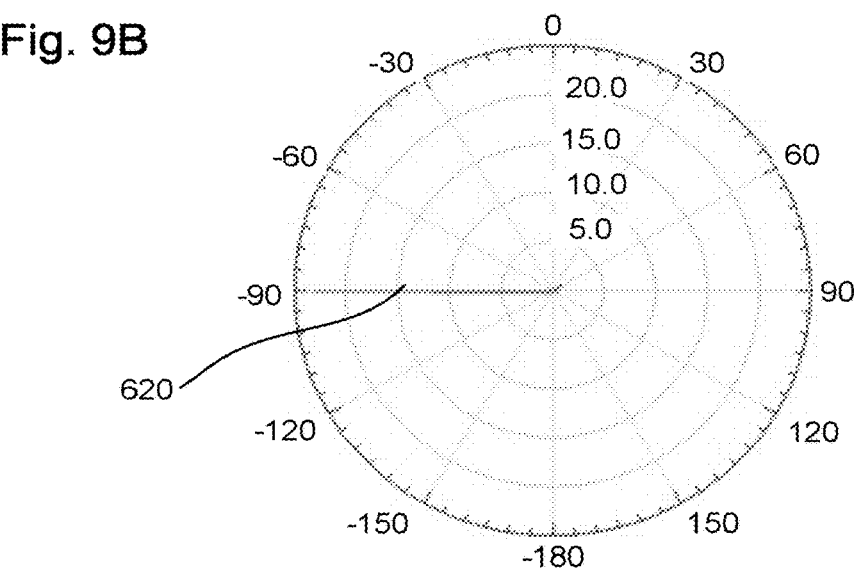
FIG. 9B represents scattering patterns for the blade middle part coated with the planar absorber, according to certain aspects of the disclosure.
Figure 9C:
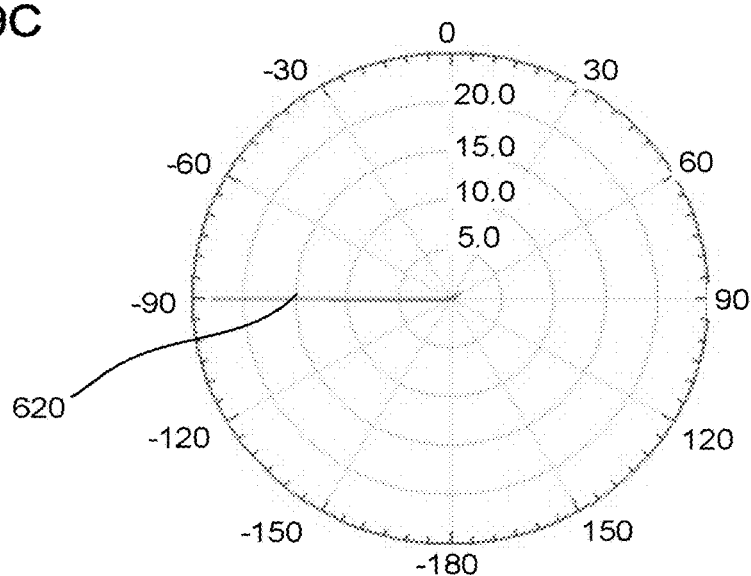
FIG. 9C represents scattering patterns for the blade middle part coated with the curved absorber, according to certain aspects of the disclosure.
Figure 10A:
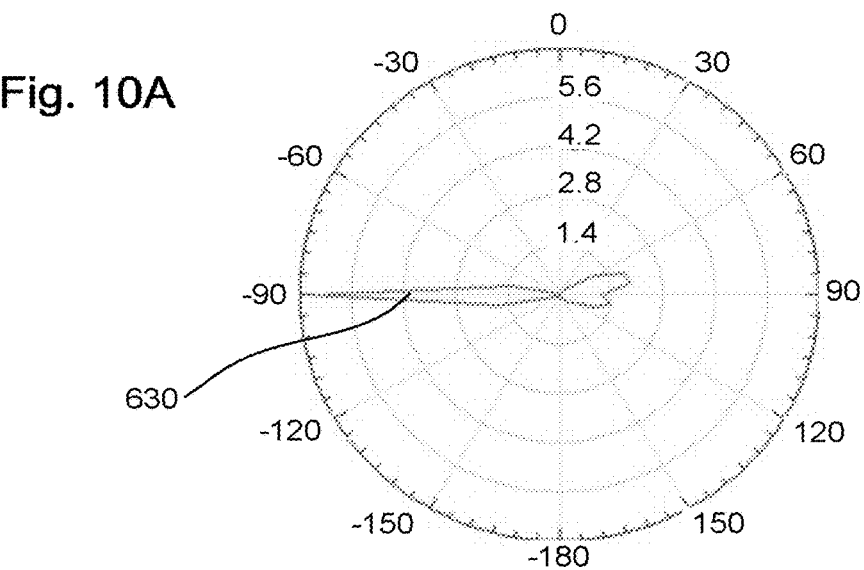
FIG. 10A represents scattering patterns for the blade tip without a coating, according to certain aspects of the disclosure.
Figure 10B:
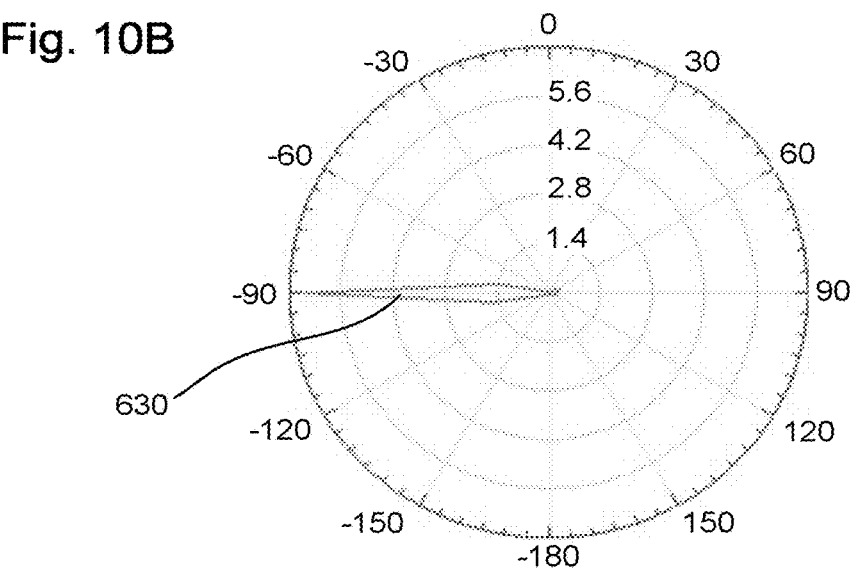
FIG. 10B represents scattering patterns for the blade tip coated with the planar absorber, according to certain aspects of the disclosure.
Figure 10C:
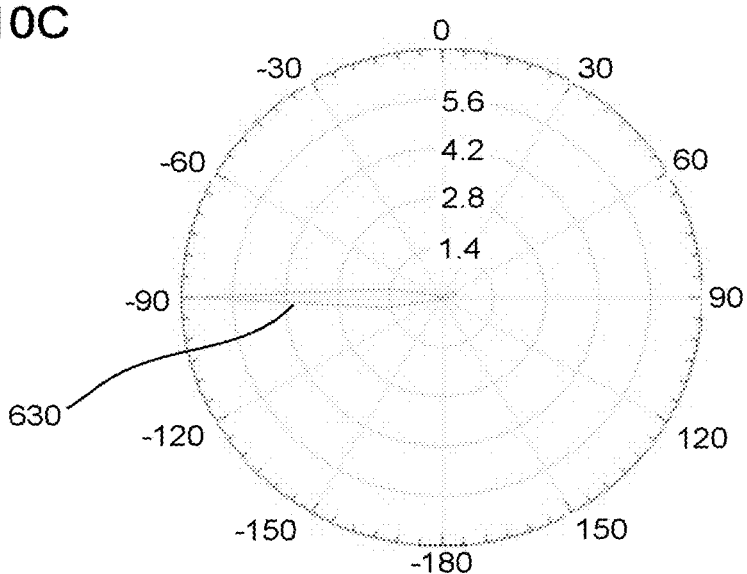
FIG. 10C represents scattering patterns for the blade tip coated with the curved absorber, according to certain aspects of the disclosure.

FIGS. 8A-8C represent scattering patterns for the blade root 610 without the coating 800, coated with the planar absorber P-900, and coated with the curved absorber C-900, respectively and according to certain aspects of the disclosure. FIGS. 9A-9C represent scattering patterns for the blade middle part 620 without the coating 800, coated with the planar absorber P-900, and coated with the curved absorber C-900, respectively and according to certain aspects of the disclosure. FIGS. 10A-10C represent scattering patterns for the blade tip 630 without the coating 800, coated with the planar absorber P-900, and coated with the curved absorber C-900, respectively and according to certain aspects of the disclosure.

The blade root 610, the blade middle part 620, and/or the blade tip 630 may be coated with the curved absorber C-900 to limit the electromagnetic scattering. Alternatively, the blade middle part 620 may be coated with the curved absorber C-900 while the blade root 610 and the blade tip 630 may be coated with the planar absorber.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A wind turbine blade with reduced electromagnetic scattering consisting of:
   a plurality of support members;
   a shell supported by the plurality of support members;
   a blade root;
   a blade tip opposite the blade root; and
   a blade middle part extending between the blade root and the blade tip, the blade middle part including
      a leading surface that extends between the blade root and the blade tip in a longitudinal direction and from a leading edge along a predetermined leading radius in a downstream direction, the predetermined leading radius corresponds to a point where a curvature of the blade middle part reaches a predetermined leading curvature threshold corresponding to a percentage of a local leading curvature,
      a trailing surface opposite the leading surface and that extends between the blade root and the blade tip in a longitudinal direction and from a trailing edge along a predetermined trailing radius in a upstream direction, the predetermined trailing radius corresponds to a point where a curvature of the blade middle part reaches a predetermined trailing curvature threshold corresponding to a percentage of a local trailing curvature,
      a pressure surface that extends between the trailing surface and the leading surface in the downstream direction, and
      a suction surface opposite the pressure surface that extends between the trailing surface and the leading surface in the downstream direction; and
   a plurality of multi-layer absorbers to limit the electromagnetic scattering that includes at least one of cobalt ferrite alloy nano-particles (CoFe NP), cobalt ferrite alloy nano-flakes (CoFe NF), and air, the plurality of multi-layer absorbers including:
      a first curved absorber that covers the suction surface and the pressure surface, including a first layer filled with air and in direct and continuous contact with a second layer, the second layer filled with CoFe NF and in direct and continuous contact with a third layer, the third layer filled with air and in direct and continuous contact with a fourth layer, the fourth layer filled with CoFe NP,
      a second curved absorber that entirely covers the trailing surface and the leading surface, including a first layer filled with CoFe NF and in direct and continuous contact with a second layer, the second layer filled with air and in direct and continuous contact with a third layer, the third layer filled with CoFe NF and in direct and continuous contact with a fourth layer, the fourth layer filled with air and in direct and continuous contact with a fifth layer, the fifth layer filled with CoFe NF and in direct and continuous contact with a sixth layer, the sixth layer filled with air and in direct and continuous contact with a seventh layer, the seventh filled with CoFe NP, and
      a planar absorber that covers the blade root and the blade tip, including a first layer filled with CoFe NF and in a direct and continuous contact with a second layer, the second layer being filled with CoFe NP, wherein the local leading curvature is in between to 20 to 30 and the local trailing curvature is between 300 to 500.

2. The wind turbine blade of claim 1, wherein the first layer of the second curved absorber has a thickness between 11.45 mm and 11.55 mm, and the seventh layer of the second curved absorber has a thickness between 0.60 mm and 0.65 mm.

3. The wind turbine blade of claim 1, wherein the first layer of the first curved absorber has a thickness between 2.10 mm and 2.20 mm, and the fourth layer of the first curved absorber has a thickness between 0.60 mm and 0.70 mm.

4. The wind turbine blade of claim 3, wherein the the third layer of the first curved absorber has a thickness between 1.28 mm and 1.38 mm.

5. The wind turbine blade of claim 1, wherein at least one of the first curved absorber, and the second curved absorber is covered with a resistance sheet made with graphene.

6. The wind turbine blade of claim 1, wherein at least one of the first curved absorber, and the second curved absorber contains a graphene-coated ferrite nano-composite.

7. A wind turbine with reduced electromagnetic scattering consisting of:
   a wind turbine support structure having a cylindrical shape;
   a plurality of wind turbine blades supported by the wind support structure, each wind turbine blade of the plurality of wind turbine blades consisting of
   a plurality of support members;
   a shell supported by the plurality of support members;
   a blade root,
   a blade tip opposite the blade root, and
   a blade middle part extending between the blade root and the blade tip, the blade middle part including
      a leading surface that extends between the blade root and the blade tip in a longitudinal direction and from a leading edge along a predetermined leading radius in a downstream direction, the predetermined leading radius corresponds to a point where a curvature of the blade middle part reaches a predetermined leading curvature threshold corresponding to a percentage of a local leading curvature,
      a trailing surface opposite the leading surface and that extends between the blade root and the blade tip in a longitudinal direction and from a trailing edge along a predetermined trailing radius in a upstream direction, the predetermined trailing radius corresponds to a point where a curvature of the blade middle part reaches a predetermined trailing curvature threshold corresponding to a percentage of a local trailing curvature,
a pressure surface that extends between the trailing surface and the leading surface in the downstream direction, and
a suction surface opposite the pressure surface that extends between the trailing surface and the leading surface in the downstream direction; and
a plurality of multi-layer absorbers to limit the electromagnetic scattering that includes at least one of cobalt ferrite alloy nano-particles (CoFe NP), cobalt ferrite alloy nano-flakes (CoFe NF), and air, the plurality of multi-layer absorbers including:
a planar absorber that entirely covers the wind turbine support structure including a first layer filled with CoFe NF and in a direct and continuous contact with a second layer, the second layer being filled with CoFe NP, and
a curved absorber that entirely covers the middle part including a first layer filled with CoFe NF and in direct and continuous contact with a second layer, the second layer filled with air and in direct and continuous contact with a third layer, the third layer filled with CoFe NF and in direct and continuous contact with a fourth layer, the fourth layer filled with air and in direct and continuous contact with a fifth layer, the fifth layer filled with CoFe NF and in direct and continuous contact with a sixth layer, the sixth layer filled with air and in direct and continuous contact with a seventh layer, the seventh filled with CoFe NP.

8. The wind turbine of claim 7, wherein the first layer of the planar absorber has a thickness between 1.70 mm and 1.80 mm, and the second layer of the planar absorber has a thickness between 1.20 mm and 1.30 mm.

9. The wind turbine of claim 7, wherein the first layer of the curved absorber has a bottom thickness between 11.45 mm and 11.55 mm, and the seventh layer of the curved absorber has a top thickness between 0.60 mm and 0.65 mm.

10. The wind turbine of claim 9, wherein the curved absorber includes an intermediary layer between the first layer and the seventh layer containing air and having an intermediary thickness between 3.35 mm and 3.40 mm.

11. The wind turbine of claim 7, wherein at least one of the planar absorber, and the curved absorber is covered with a resistance sheet made with graphene.

\* \* \* \* \*